(12) United States Patent
Farzam (10) Patent No.: US 12,374,051 B2
(45) Date of Patent: Jul. 29, 2025

(54) METHOD AND SYSTEM FOR VIRTUAL AND SEMI-VIRTUAL EVENTS AND EXHIBITS

(71) Applicant: Inhance Digital Corporation, Los Angeles, CA (US)

(72) Inventor: Maziar Farzam, Los Angeles, CA (US)

(73) Assignee: Inhance Digital Corporation, Los Angeles, CA (US)

( * ) Notice: Subject to any disclaimer, the term of this patent is extended or adjusted under 35 U.S.C. 154(b) by 379 days.

(21) Appl. No.: 17/751,661

(22) Filed: May 23, 2022

(65) Prior Publication Data

US 2022/0375167 A1 Nov. 24, 2022

Related U.S. Application Data

(60) Provisional application No. 63/191,912, filed on May 21, 2021.

(51) Int. Cl.
| | |
|---|---|
| *G06T 19/00* | (2011.01) |
| *G06F 3/01* | (2006.01) |
| *G06T 1/20* | (2006.01) |
| *G06T 17/20* | (2006.01) |
| *H04L 67/131* | (2022.01) |

(52) U.S. Cl.
CPC ............ *G06T 19/003* (2013.01); *G06F 3/013* (2013.01); *G06T 1/20* (2013.01); *G06T 17/20* (2013.01); *G06T 19/006* (2013.01); *H04L 67/131* (2022.05); *G06T 2200/08* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2008/0186194 A1* | 8/2008 | Kaminski | G05B 19/4065 340/683 |
| 2014/0032314 A1* | 1/2014 | Gieseke | G06Q 30/02 705/14.49 |
| 2017/0323489 A1* | 11/2017 | Clement | A63F 13/52 |
| 2018/0112996 A1* | 4/2018 | Montell | G01C 21/3682 |
| 2018/0255335 A1* | 9/2018 | George | H04N 21/4532 |
| 2018/0374264 A1* | 12/2018 | Gatson | G01S 15/87 |
| 2020/0117336 A1* | 4/2020 | Mani | F25B 49/005 |
| 2020/0348641 A1* | 11/2020 | Li | G06N 20/00 |

* cited by examiner

*Primary Examiner* — Tapas Mazumder
(74) *Attorney, Agent, or Firm* — Akerman LLP; Travor Coddington (57) ABSTRACT

The present invention provides a method and system for virtual and semi-virtual events and exhibits. The present invention provides the ability for virtual attendees to interact with points of interest and objects within the virtual environment. The present invention also provides exhibitors with analytics that allows the exhibitor to objectively evaluate various aspects of exhibits. The present invention also allows the exhibitors to customize the exhibition experience of individual attendees based on attendee-specific interactions and information.

13 Claims, 7 Drawing Sheets

METHOD AND SYSTEM FOR VIRTUAL AND SEMI-VIRTUAL EVENTS AND EXHIBITS

CROSS-REFERENCE TO RELATED APPLICATION

This application claims priority to U.S. Provisional Patent Application No. 63/191,912, filed on May 21, 2021, and entitled "Method and System for Virtual and Semi-Virtual Events and Exhibits," the entire disclosure of which is incorporated by reference herein.

BACKGROUND OF THE INVENTION

1. Field of Invention

The invention relates to an immersive user-navigable virtual space and, more particularly, a method and system for immersive real-time virtual and semi-virtual exhibits and events.

2. Description of Related Art

Physical, in-person exhibitions routinely occur throughout the world and they are difficult and costly to physically attend. Additionally, the COVID-19 pandemic has demonstrated that in-person attendance at such events may subject attendees to health risks and that such events may be precluded from taking place. With advancements in computer-implemented systems and methods, virtual attendance is possible.

However, virtually attending exhibitions is lackluster because the attendee loses much of the interactivity of the in-person exhibition. For example, virtual attendance of an exhibition precludes the human, face-to-face interaction afforded to in-person attendees. Often, virtually attending an exhibition merely gives the virtual attendee a video stream analogous to a recording of walking around the in-person exhibition or watching a presenter at an exhibition or seminar. Additionally, exhibitors typically desire to detect, track, and record attendance at exhibitions. However, it is difficult for an exhibitor to track and record an attendee's virtual interactions with particular physical exhibits or points of interest within specific exhibits.

Currently, most exhibitors provide a means for attendees to be notified of additional information or follow-up activity. For example, exhibitors often have sign-up sheets or electronic lead capture system that allow the attendees to input some identifying information that enable the exhibitor to communicate with those attendees at a later time. Exhibitors may also provide a repository where an attendee can deposit his/her business card. However, these methods are deficient because attendees maybe interested but fail to use one of the sign-up methods. In addition, exhibitor staff may also fail to use the lead capture systems to capture attendee's information or take adequate notes about attendees needs, interest, or objectives for the visit to the exhibit. Also, current techniques only allow exhibitors to garner minimal feedback regarding their exhibit, product, or services within the physical space. Current techniques do not allow exhibitors to accumulate meaningful, in-depth information that would allow the exhibitor to analyze and improve their exhibition techniques, features, or their sales and marketing efforts within a physical space.

In light of these challenges in the field, there is a need for virtual exhibitions that still provide attendees the same interaction they would have received had they physically attended the exhibition. There is also a need to provide a semi-virtual exhibition that augments physical exhibitions with media and other interactions that are typically reserved for the virtual space. Also needed is a method and system for detecting, tracking, storing, and analyzing attendee interaction thereby providing exhibitors with objective data metrics. This need has heretofore remained unsatisfied.

SUMMARY OF THE INVENTION

The present invention overcomes these and other deficiencies of the prior art by providing a method and system for virtual and semi-virtual events and exhibits.

In an embodiment, a virtual exposition is generated comprising a plurality of exhibits. A user registers as an attendee; alternatively, a user needs to register to attend the exposition. An avatar may be generated. The attendee may use the avatar to navigate the exposition. The attendee may interact with a plurality of points of interest or objects within the environment. Each point of interest may be associated with media that is presented to the attendee. The attendee may interact with the media.

In another embodiment, an exhibitor creates a physical space that is augmented by a generated virtual environment. In such an embodiment, an attendee's physical presence is mapped to the generated virtual environment.

In another embodiment, the attendee's interactions are recorded. The data associated with the attendee's interactions may be used to generate reports or records that summarize and/or detail the attendee's interactions.

In certain embodiments, the invention provides features, without regard to order or hierarchy.

In an embodiment of the invention, the system provides a Real-Time 3D Virtual World (Environment) System. For example, the invention provides a real-time 3D world, 3D environment or 3D product that consists of 3D models, 3D wireframes, textures, materials, virtual cameras, and lighting, that seamlessly download into the web browser window (no plug-in downloads needed). In some environments, the real-time 3D world resembles a physical room, tradeshow exhibit, event space, expo, or any 3D environment or virtual world, including virtual human avatars and virtual 3D products. The real-time 3D world may use WebGL, OpenXR, WebXR, or other Web 3D APIs to render and present the virtual environments, running within a web browser, or in a virtual reality (VR) head-mounted display (VR HMD), or on desktop PCs, laptops, mobile phones, tablets, or other computing devices, without needing to download a web plug-in. The user/attendee initiates the experience by accessing a simple URL web address, the 3D world then loads into the browser window. Graphics and Texture-Maps in the real-time 3D world are changeable, via a content management system or CMS as described herein. The CMS allows swapping out and replacement of virtual graphics and texture-maps (textures of walls and other surfaces, environments, signage, etc) using a web-based HTML interface. A dynamic virtual camera system, that allows the virtual visitor to teleport from one virtual location to the next, and also linked to the Navigation System as described herein, both Points of Interest (POI) Interface, as well as Persistent Navigation Interface.

In another exemplary embodiment, the invention provides a navigation system. In an embodiment, the navigation system provides a Points of Interest (POI) interface that may be virtually represented on both 2D and 3D environments as digital overlays on top of 2D or 3D rendered images. POIs comprise a circular (animated), or pin-shaped, balloon (string and sphere) or any graphic element, overlaid on top of the Real-time 3D rendered scene or 2D scene. POIs may also comprise a text description pop-up overlay. The POI interface allows the user or virtual 3D camera to move from one point of interest to the next point of interest or teleport the user or the 3D camera in the 3D scene. In certain environments, the navigation system provides various POI variations and use cases. For example, navigation system provides for Video POI: hotspots for virtual environment's or exhibit's virtual video walls. Such a video POI allows for video playback, where the digital video can be in any format (e.g., MP4) or from any streaming video sites (e.g., YouTube, Vimeo, etc.) can play as either an animated texture-map in the 3D, preloaded or streaming video. Another POI variation includes Graphics POI: hotspots for virtual environment or virtual exhibit graphics. Such graphics are either static (e.g., in forms of JPEG, PNG, TIFF, etc.) or animated (e.g., animated GIF, etc.). Another POI variation includes Document POI: hotspots for virtual environment or virtual exhibit digital documents. Such documents are in form of PDF, HTML, Microsoft PowerPoint, Microsoft Word, or any other digital document formats. Another POI variation includes Interactive Model POI: hotspots for interactive 3D models, virtual models, or digital twins of a product within the virtual exhibit or virtual environment.

In some exemplary environments, the navigation system provides a persistent navigation (e.g., Top, Left or Bottom) interface. In some embodiments, navigation interface comprises a graphical user interface and buttons, either in 2D or 3D, allowing hierarchical access and navigation to key 3D navigation, and content areas. The main navigation/content menu may be presented as an HTML layer, either in a frame surrounding the real-time 3D environment, overlaid on top of the 3D environment, or presented as "hamburger" navigation in mobile implementation. The main navigation/content menu comprises textural, or iconic description of Point of Interest, content, or other information in a virtual or semi-virtual exhibit. The main navigation/content menu also comprises a sub-menu, presented as 2D or 3D buttons, graphically shown under or below the main navigation. Sub-menu provides access to the second tier of content or information.

In another exemplary embodiment, the navigation system provides Digital Literature or e-Briefcase Navigation Interface. Such an interface comprises a graphical user interface for viewing, collecting, and/or storing/saving digital documents and literature in the virtual space. In some environments, the Digital Literature e-Briefcase may resemble a folder icon or cabinet icon, and a circular numerical indicator, showing the number of documents collected or stored, downloaded, or viewed. The interface may further comprise a main window that displays the digital literature (e.g., PDF) that may be selected, using a digital document's native viewer functionality (e.g., scroll, page up/down, zoom in/out). The interface may further comprise a lower half window that displays icons of each digital file/literature available. The interface may further comprise a (+) icon, allowing the user to add the digital literature (e.g., PDF) to their e-Briefcase, with a pop-up message windows that states "An item has been added to your download folder" and "OK" button to confirm.

In an embodiment, the e-Briefcase Window Interface comprises a name list of digital files/literature selected by the user and a checkbox system next to each file name, allowing the user to select/deselect the files. The e-Briefcase window interface may further comprise an Email field allowing the user to enter his or her email. The e-Briefcase window interface me for the comprise a "Send" button that activates the email functionality to attach the digital files as an outbound email attachment. The e-briefcase window interface play further comprise a "Download Selected" button, allowing the user to download the digital files locally to their computer. The e-Briefcase window interface further comprise a "Cancel" button, allowing the user to close the e-Briefcase window.

In another exemplary embodiment, the invention provides a Content Management System ("CMS"). In an embodiment, the CMS comprises a CMS Frontend Interface that may be embodied by a web-browser based interface for updating content inside the virtual exhibit and event platform. The CMS frontend interface may further comprise a login page, comprising a Username and Password, to provide secure log-in to the URL address of the admin portal. The CMS front end interface may further comprise an Admin Portal: An HTML Interface that includes the following interface menu items and areas: The HTML interface may comprise a dashboard that includes a number of charts/gauges demonstrating last content uploaded, last log-in, or other admin data. The HTML interface may comprise an Exhibit or Event Name(s) that includes the Exhibit or Event Name, URL address, and Edit/Delete buttons. The HTML interface may comprise an interface that allows adding users and their type of access to the CMS. The HTML interface may comprise a User Screen, which allows adding user's first and last name, email, password, add/update button, reset password button. The HTML interface may comprise a Hotspot Management Interface that allows the user to add POIs (hotspots) on the 3D or 2D environment, by dragging and dropping POI icons or similar method. The Hotspot Management Interface may further comprise a Hotspot Content Screen that allows a user to assign content windows and type of content (e.g., video, images, files, etc.). The HTML interface may further comprise a Logo (of end client or user) and a User Account Management interface. In some embodiments, the CMS further comprises a CMS Backend that may further comprise an online database (e.g., MongoDB, or similar scalable database, etc.).

In another exemplary embodiment, the invention provides a Data Collection, User Metrics, and Data Analytics System. In some embodiments, the invention captures certain data. For example, a virtual exhibit attendee's information is captured via simple contact web form (comprising, e.g., user's name, address, email, phone, etc.). The invention includes, but is not limited to, two modes of user capture: anonymous, and registered (through the sign-in form). Both modes include end of event day metrics, end of event total metrics, and monthly or annual event metrics.

In another exemplary embodiment, the invention provides Analytics Integration. In an embodiment for example, all user/attendee metrics may be captured for each exhibit/event include Analytics and Tag Manager including but not limited to: Unique visitors, Sessions, Page views, Bounce rate, Content downloads, Video watched, Dwell time. In addition, all user clicks/interactions through the Interface are captured. The invention provides integration with third-party tag managers, for each specific digital literature or video content within the virtual exhibit or event. Certain analytics integration includes using eye tracking technology, which track user's eye iris movement and gaze. It tracks where the user looks at and how long they gaze at a virtual object, both in the 3D virtual exhibit environment and other 2D element, the implementation of which would be readily apparent to one skilled in the art. Eye tracking or gaze detecting technology uses hardware such as a video camera built into the computing device, or external webcam and running when the web-browser is launched. Certain analytics integration further includes 3D heat-mapping, to track where the attendee spends time in the 3D virtual space Certain analytics integration further includes facial expression tracking and analysis, using hardware, to track user emotional expression. In some embodiments, the analytics integration comprises a Data Visualization Dashboard.

In another exemplary embodiment, the invention provides a Communication and Collaboration System.

In another exemplary embodiment, the invention provides a Hybrid Exhibit and Event System: Physical and Digital Tradeshow Communications, Avatar and Physical Attendee Interactions and Linkage. Virtual and physical attendees create their avatar prior to the event. In some embodiments, the virtual 3D space can be represented as an exhibition floor, mall, individual exhibits/stands/rooms. In some embodiments, the semi-virtual or hybrid experience (e.g., Physical+Virtual) is accessible from desktop, tablet, mobile, AR/VR HMD or any other computing or wearable computing device. The virtual exhibit environment allows for multiple virtual visitors (with or without avatars) to simultaneously interact with physical visitors in the exhibit space (who have selected an opt-in feature). 3D product models in the virtual environment are digital reproductions of the physical product models in the physical space and can be interactive and accessed and interacted with by both virtual and physical participants or visitors. In both virtual and physical exhibits, both virtual and physical visitors/attendees are able to talk to and see each other, via, e.g., two-way video communication interface, text-chat, and voice chat; find where other visitors are in virtual exhibit using a mini-map navigation tool, enabled by avatar's 3D model location in the virtual environment. Alternatively, the visitors/attendees are able to find where other visitors are in a physical environment using tracking technology such as GPS, Inertial Tracking, NFC, RFID, or other positional tracking technology; follow exhibit host(s) from one exhibit area to a subsequent area; transmit/display pictures/videos from virtual visitors onto the video displays/walls of the physical exhibit; and play interactive games with other physical and virtual attendees The foregoing and other features and advantages of the invention will be apparent from the following, a more detailed description of the invention's preferred embodiments and the accompanying drawings.

BRIEF DESCRIPTION OF THE DRAWINGS

For a complete understanding of the present invention and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-7. The described features, structures, or characteristics of the invention may be combined in any suitable manner in one or more embodiments. It will be apparent to those skilled in the art that modifications and variations can be made to the present invention without departing from the invention's spirit and scope. Thus, it is intended that the current invention cover all modifications and variations consistent with the scope of the appended claims and their equivalents.

Figure 1:
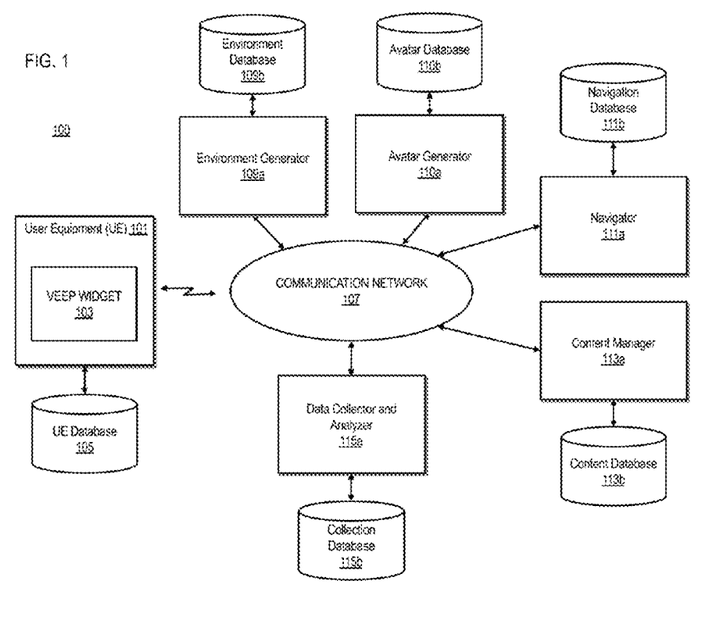
FIG. 1 is an exemplary diagram of a system capable of providing a virtual and semi-virtual event and exhibition environment, according to an embodiment of the invention.

FIG. 1 is a diagram of a system capable of generating a virtual event and exhibit, according to one embodiment. Exhibitions routinely occur throughout the world and they are difficult and costly to physically attend. With advancements in computer-implemented systems and methods, virtual attendance is possible. However, virtually attending exhibitions is lackluster because the attendee loses much of the interactivity of the exhibition. Additionally, exhibitors desire to detect, track, and record attendance at exhibitions. However, it is difficult for an exhibitor to track and record an attendee's interactions with particular exhibits or points of interest within specific exhibits. Currently, exhibitors typically provide a means for attendees to be notified of information. For example, exhibitors often have sign-up sheets or electronic lead capture or badge scanning that allow the attendees to input some identifying information that enable the exhibitor to communicate with those attendees at a later time. Exhibitors may also provide a repository where an attendee can deposit his/her business card. However, these are extremely deficient because attendees may be interested by fail to use one of the sign-up methods above. Also, current techniques only allow exhibitors to garner minimal feedback regarding their exhibit and their included products and services. Current techniques do not allow exhibitors to accumulate meaningful, in-depth information that would allow the exhibitor to analyze and improve their exhibition techniques and features.

To address this problem, a system 100 of FIG. 1 introduces the capability to provide a virtual and semi-virtual event and exhibition environment that has virtual components. Embodiments include a physical exhibition environment that is augmented with digital, virtual characteristics, a wholly virtual digital exhibition environment, or a combination thereof. The system 100 has the added benefit of being able to track exhibition goers while enhancing the experience of attendees. The invention provides a method and system for generating a user-navigable virtual or semi-virtual exhibition environment that allows attendees to interact with objects or points of interest within the exhibition. System 100 also enables the exhibitor to track and record the attendee's interactions within the exhibition, thereby allowing the exhibitor to generate in-depth information regarding the attendee's interactions, which provides objective meaningful feedback and allow the exhibitor to customize follow-up information based on a particular attendee's interests.

As shown in FIG. 1, the system 100 comprises a user's equipment (UE) 101 having connectivity to environment generator 109a, navigator 111a, content manager 113a, and data collector and analyzer 115a via a third-party communication network 107. By way of example, the third-party communication network 107 of system 100 includes one or more networks such as a data network (not shown), a wireless network (not shown), a telephony network (not shown), or any combination thereof. The user's equipment may be any third-party electronic device that is capable of displaying images such as computers, tablets, handheld devices, headsets, etc. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. Additionally, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The UE 101 is any type of mobile terminal, fixed terminal, or portable terminal including a mobile handset, cellular telephone, smartphone, tablet, station, unit, device, multimedia tablet, Internet node, communicator, desktop computer, laptop computer, Personal Digital Assistants (PDAs), virtual reality (VR) headset, augmented reality (AR) headset, head-mounted display (VR HMD or AR HMD), smart glass, optical head-mounted display, peripheral head-mounted display, or any combination thereof. It is also contemplated that the UE 101 can support any type of interface to the user (such as "wearable" circuitry, etc.).

By way of example, the UE 101, environment generator 109a, avatar generator 110a, navigator 111a, content manager 113a, and data collector and analyzer 115a communicate with each other and other components of the third-party communication network 107 using well known, new, or still developing protocols. In this context, a protocol includes a set of rules defining how the network nodes within the third-party communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In an exemplary embodiment, system 100 comprises an environment generator 109a. The environment generator 109a may be communicatively connected to environment database 109b by, for example, using a third-party communication network 107. In some embodiments, the environment generator 109a generates two-dimensional and/or three-dimensional models of virtual environments. For example, environment generator 109a constructs such virtual environments by accessing three-dimensional (3D) wireframes or models stored on, for example, environment database 109b. Environment generator 109a modifies the accessed wireframes or models by adding, for example, textures, materials, virtual cameras, and/or lighting, which may also be stored on environment database 109b. The generated virtual environment is communicated to UE 101 and/or VEEP widget 103. The textures, materials, appearance, layout, or other attribute of the generated virtual environment are interchangeable though, for example, via content manager 113a.

The generated virtual environment comprises attributes analogous to in-person exhibitions, conferences, or tradeshows. For example, in some embodiments, the generated virtual environment may comprise a physical room, one or more tradeshow exhibits, an event space, and an exposition. The environment generator also provides virtual points of interest (POIs) displayed within the generated virtual environment. In some embodiments, the environment generator 109a may also provide a dynamic virtual camera that follows the attendee's virtual avatar as it navigates though the virtual environment. The generated virtual environment may be modeled from a specific physical environment. For example, an exhibitor's virtual environment may be a virtual model of that exhibitor's physical headquarters or showroom.

UE 101 may utilize any application programming interface (API) to generate and display the virtual environments. For example, UE 101 and/or VEEP widget 103 may use WebGL, OpenGL, OpenGL ES, OpenXR, WebXR, or other Web 3D API to render and display the virtual environment. Other Web 3D APIs include, but are not limited to, Direct3D, Glide, Mantle, Metal, QuickDraw 3D, RenderMan, Vulkan, and LibGCM, BGFX, ClanLib, Crystal Space, HOOPS 3D Graphics System, Horde3D, Irrlicht Engine, Java 3D, Java FX, JMonkey Engine, JT Open from Siemens PLM Software, Mobile 3D Graphics API (M3G; JSR-184), OGRE, OpenGL Performer, OpenSceneGraph, OpenSG, QSDK, RenderWare, Panda3D, Unigine, VTK, A-Frame, Blend4Web, CopperLicht, O3D, StormEngineC. Three.js, Babylon.js, Verge3D, and X3DOM. Such embodiments may or may not rely on downloadable web plug-ins to operate.

In some embodiments, a user may initiate the system by simply accessing a URL web address using UE 101 through a web browser and/or VEEP widget 103. Once a user initiates system 100, the user can enter the exhibition environment as an attendee. In an embodiment where the exhibition or event is completely virtual, the attendee accesses the points of interest by navigating and interacting with the virtual environment by, for example, using navigational controls through UE 101 and/or VEEP widget 103. In other embodiments, the exhibition may be a combination of virtual and real-world environments. In such an embodiment, a physical environment may have POIs or objects with which an attendee may interact. The attendee may interact with such POIs through, for example, using UE 101 and/or VEEP widget 103. In such an embodiment, the physical environment may have indictors, for example, a machine-readable optical label that contains information about the object or POI to which it is associated. An example of such labels includes quick response (QR) codes. In such an embodiment, a POI in the physical environment may have an associated QR code. The attendee may read the QR code with, for example, UE 101 and/or VEEP widget 103, which causes the UE 101 and/or VEEP widget 103 to display the virtual environment thereon. The attendee may continue to use UE 101 and/or VEEP widget 103 to interact with the virtual environment while also interacting with the physical environment of the exhibition. In this way, an exhibition can offer a physical environment that is augmented with a virtual environment to enhance the attendee's experience. Embodiments implementing physical and virtual environments have the added benefit of allowing system 100 to detect and record the objects and POIs each attendee interacts with greater accuracy. Attendees may also interact with other attendees with the exhibition environment. Attendees may be displayed as avatars. Such avatars may be predetermined or customizable by the system 100 via avatar generator 110a, by the attendee, or both.

In some embodiments, the system 100 comprises an avatar generator 110a. The avatar generator 110a may be communicatively connected to environment database 109b by, for example, using communication network 107. In some embodiments, the avatar generator 110a generates three dimensional models of virtual exhibition attendees. For example, avatar generator 110a constructs such virtual avatars by accessing three dimensional (3D) wireframes or models of virtual human/humanoid stored on, for example, environment database 109b. Avatar generator 110a modifies the accessed virtual character or virtual human wireframes or models by adding, for example, textures, materials, virtual cameras, and/or lighting, which may also be stored on avatar database 110b. In other embodiments, avatar generator 110a creates photo-realistic 3D representation models of the actual human visitor using photogrammetry techniques and built-in digital cameras on UE 101. The generated virtual avatar is communicated to UE 101 and/or VEEP widget 103. The textures, materials, appearances, layout, virtual clothing, virtual hair, or other virtual facial or body attributes of the generated virtual avatars such as type of hair, hair color, eye color, nose shape and size, etc. are interchangeable though, for example, via content manager 113a.

In another embodiment, system 100 comprises navigator 111a and navigation database 111b. UE 101 is communicatively connected to navigator 111a and/or navigation database 111b through, for example, communication network 107. Navigator 111a may be operatively connected to navigation database 111b through communication network 107.

In some embodiments, navigator 111a provides a POI interface. In such an embodiment, a POI may be represented in a virtual environment, as either two-dimensional (2D) or 3D objects, as digital overlays. In some embodiments, POIs may be displayed as a circular, pin-shaped, or as a balloon.

In some embodiments, the POIs may be animated or otherwise react to a user's interaction. The POI interface allows the user to navigate through a generated virtual environment by giving the user the impression the user is viewing the virtual environment through a virtual camera. Additionally, or alternatively, the POI interface allows the user to navigate the virtual environment by virtually "jumping" or "teleporting" from one location in a virtual environment to another location within the virtual environment. Interaction with a POI within the exhibition environment may also trigger multimedia presentation, for example, a prerecorded video. In other embodiments, interacting with a POI may trigger a teleconference or videoconference with a person, thereby allowing the exhibitor's representatives to personally interact with attendees, thereby enhancing the attendee's experience.

Navigator 111a generates different types of POIs. In some embodiments, the navigator 111a generates video POIs—hotspots displayed in the virtual environment. In such an embodiment, video POIs allow for video playback wherein the digital video can be played within the virtual environment. The system 100 can implement any type of video format including WebM, Matroska, Flash Video, F4V, Vob, Ogg Video, Dirac, graphics interchange format (GIF), audio video interleave (AVI), MPEG, QuickTime, Windows Media Video, or MPEG-4. In some embodiments, the system 100 accesses remote data files stored on third-party servers/systems to generate multimedia POIs, for example, video files stored on YouTube, Vimeo, Dailymotion, TikTok, Instagram, Facebook, Jetpack, Wistia, vooPlayer, Brightcove, SproutVideo, and Uscreen. In another embodiment, navigator 111a generates graphic POIs. Such graphic POIs may be implemented to denote a hotspot for virtual environment or virtual exhibit graphics. Such POIs may be JPEG, PNG, TIFF, etc. Additionally, such graphic POIs may be animated, such as a GIF. In another embodiment, navigator 111a generates document POIs. In such an embodiment, the document POIs include portable document format (PDFs), hypertext markup language (HTML), Microsoft PowerPoint, Microsoft Word, plain text, rich text format, Open XML, DjVu, and electronic publication (EPUB).

In some embodiments, navigator 111a provides a persistent navigation interface comprising a graphical user interface (GUI) that comprises buttons, either 2D or 3D, allowing hierarchical access and navigation to key three-dimensional navigation and content areas. In some embodiments, the persistent navigation interface comprises a main navigation/content menu that is presented as an HTML layer, either in a frame surrounding the virtual environment, overlaid on top of the virtual environment, or presented as a "hamburger" navigation in, for example, a mobile application. In other embodiments, the main navigation/content menu comprises textural, virtual signage in the 3D environment itself.

In another exemplary embodiment, the invention further includes a content manager 113a. Content manager 113a communicates with content database 113b using a network, for example, communication network 107. In some embodiments, content manager 113a provides access to a web-browser-based interface that provides and updates a virtual environment. In some embodiments, content manager 113a updates the virtual environment to be displayed on UE 101 and/or VEEP widget 103. In some embodiments, content manager 113a provides a login page requiring, for example, a user to input his/her credentials, e.g., username and password, to access the virtual environment. In such an exemplary embodiment, the user's credentials may be stored on a database, for example, content database 113b. Content database 113*b* may use, for example, an SQL or NoSQL database. For example, content database 113*b* may utilize MongoDB, a NoSQL document-oriented database program. Other types of NoSQL database programs include and are not limited to Azure Cosmos DB, Apache CouchDB, ArangoDB, BaseX, Clusterpoint, Couchbase, eXist-db, IBM Domino, MarkLogic, MongoDB, OrientDB, Qizx, and RethinkDB.

In some embodiments, content manager 113*a* provides an administrative portal. For example, the administrative portal comprises an HTML interface that includes certain access points such as a dashboard, exhibit or event details, users, hotspots, logos, accounts, and the like. In an embodiment, a dashboard may comprise a number of charts and/or gauges demonstrating and/or using various aspects of the features disclosed herein. In another embodiment, exhibit or event details includes the name, date, physical address, URL address, host details, or other identifying information. In another embodiment, the administrative portal allows a user with the proper credentials to manage other users, for example, adding or deleting user accounts and their access to the content management system, as wells as managing user accounts and their credentials.

In another exemplary embodiment, data collector and analyzer 115*a* collects and analyzes information. For example, data collector 115*a* may collect data associated with an attendee of the virtual environment by, for example, a contact form provided by system 100 and presented to the attendee by, for example, UE 101 and/or VEEP widget 103. The information collected may include a name, username, address, email, phone number, etc. In some embodiments, data collector 115*a* collects information by way of registration. In such an embodiment, a user/attendee provides certain identifying information by, for example, filling out information after being prompted through UE 101, VEEP widget 103, or other online portal. System 100 is able to monitor what an attendee interacts with in the virtual environment and/or a physical environment. In another embodiment, data collector 115*a* collects information from users/attendees anonymously. In such an embodiment, the system 100 detects an attendee, for example, by way of that unregistered attendee's contacts made within the virtual environment. The system 100 may assign a permanent or semi-permanent identifier to that unregistered attendee. In the event that attendee later registers, system 100 will reassign the semi-permanent identifier to that registered attendee. In this way, system 100 maintains data collected with respect to an attendee both before and after it registers with system 100. Each time an attendee interacts with an object within the exhibition environment, system 100 is able to track such interactions. For example, system 100 may tag each attendee and/or each object/POI that interact with each other within the exhibition environment.

The data collector and analyzer 115*a* gathers the collected information associated with registered and unregistered attendees and stores it in a database, for example, collection database 115*b*. Data analyzer 115*a* may apply any number of analytical techniques. For example, data analyzer 115*a* may track, analyze, and output unique visitors, sessions, page views, bounce rates, content downloads, videos or other multimedia viewed, and dwell time. Data analyzer may also perform tag management, for example, tagging a user each time it interacts with a specific piece of multimedia content or digital literature within the virtual or physical environment.

In some embodiments, system 100 may utilize eye tracking hardware and software to determine what objects an attendee interacts with. In an embodiment where system 100 is implemented in a physical environment, eye-tracking hardware such as cameras or other sensors are utilized to detect where an attendee's gaze lies. In such an embodiment, system 100 correlates the attendee's detected gaze with the layout of an exhibit to determine what object the attendee views. For example, an exhibition may comprise a monitor displaying an informational video playing on a loop. An attendee may approach the monitor and watch the informational video playing. System 100 detects that the attendee is viewing the video by detecting the attendee's gaze. In this way, system 100 determines that the attendee is interested in the information being displayed in the informational video. In some embodiments, system 100 is also able to determine what specific portion of the video the attendee viewed by correlating the moment in time the attendee's gaze was set to the video monitor and detecting what portion of the video was played during that specific window of time. In other embodiments, system 100 determines that an attendee has lost interest in video by detecting that the attendee is no longer gazing at the video monitor. In this way, system 100 and data analyzer 115*a* can determine what interests particular attendees and what those same attendees are not interested in. System 100 can use this information to, for example, customize that attendee's experience by not displaying videos that attendee does not watch and supplying additional videos pertaining to content that attendee is interested in. Similarly, system 100 may utilize hardware and software to track an attendee's gaze in a virtual environment, applying techniques and methods described herein.

Data collector and analyzer 115*a* may also detect, generate, and extrapolate heat maps that represent how much time an attendee spends interacting with certain objects within a virtual and/or physical exhibition environment. For example, data collector and analyzer 115*a* may detect how much time an attendee spends at certain virtual points of interest in the virtual environment. Data analyzer 115*a* may generate a gradient map that indicates how much time the attendee spent interacting with those particular virtual points of interest relative to other parameters, for example, how much time that particular attendee interacted with other points of interest. In this way, data analyzer 115*a* may determine how interested a particular attendee is in certain points of interest. In other embodiments, data collector and analyzer 115*a* utilizes facial expression tracking to determine an attendee's affinity or emotional disposition when interacting with an object. Although the invention may discuss various attributes with respect to an exhibition, any type of display or demonstration including a marketplace, a sporting event, a classroom, a gallery, a museum, etc. may be implemented without departing from the contemplated embodiments.

Figure 2:
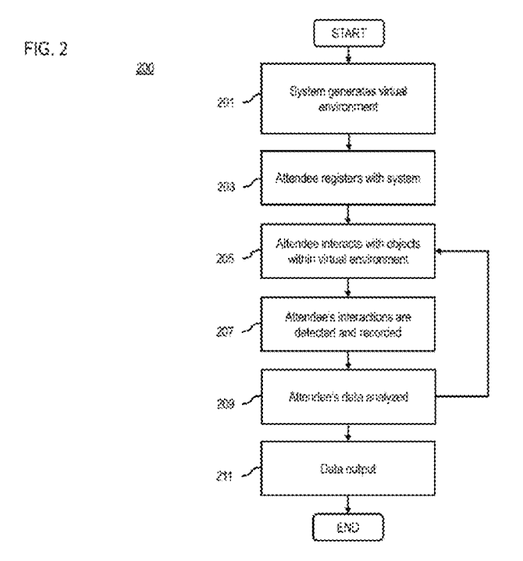
FIG. 2 is an exemplary flowchart of a process for providing a virtual and semi-virtual event and exhibition environment, according to an embodiment of the invention.

FIG. 2 is a flowchart of a process for providing an exhibition environment, according to one embodiment. In one embodiment, system 100 performs the process 200 and is implemented in, for instance, a chip set including a processor and a memory as shown FIG. 4. In another exemplary embodiment of the invention and with reference to FIG. 2, at step 201, system 100 generates a virtual environment. For example, environment generator 109*a* may build a real-time 3D virtual environment that may comprise 3D models, 3D wireframes, 3D animation, textures, materials, virtual cameras, and/or lighting. Environment generator 109*a* may build the virtual environment from certain parameters stored on a database, for example, environment database 109*b*. The generated virtual environment may further comprise virtual POIs and/or objects with which users and attendees may interact.

At step 203, an attendee registers with the system. For example, an attendee is prompted with a set of predetermined informational fields such as name, address, email address, telephone number, business name, or other identifying information. The attendee may also be prompted with additional queries that may assist the system 100 in determining the attendee's interests. For example, the attendee may be prompted to explicitly select or fill-in particular interests. In exemplary embodiment where the system 100 is used with a virtual boat exhibition, for example, an attendee may be prompted to specify what type of boats the attendee is interested in and what types of boating activities the attendee regularly engages in. For example, an attendee may specify that he/she is interested in leisure boats and often engages in wakeboarding. Such information allows system 100 to prioritize exhibits corresponding to leisurely boating and wakeboarding to enhance the attendee's experience. Although an attendee may register with system 100, such registration is not required to implement the features described herein. For example, system 100 may detect an attendee entering the virtual environment and assign an attendee identifier to that anonymous attendee so that system 100 can track and collect data pertinent to that attendee. In the even an anonymous attendee later registers, system 100 may attribute the data collected to the same attendee once registered by, for example, correlating the attendee's identifier when anonymous to that after the attendee registered.

At step 205, an attendee interacts with objects within the virtual environment. For example, an attendee may click or view POIs within the virtual environment. In some embodiments, the attendee interacts with points of interest by simply clicking on them using UE 101 and or VEEP widget 103. In other embodiments, the attendee interacts with objects within the virtual environment by gazing or looking at those objects. In other embodiments, an attendee interacts with objects by moving or navigating to or near points of interest or by clicking and moving their mouse or other input device to look around the virtual environment. In other embodiments, user may use their input device to rotate, move, zoom-in or zoom-out of a virtual product or model in the virtual environment.

At step 207, an attendee's interactions with objects in the virtual environment are detected and recorded. Each attendee, POI, and object in the environment may have a unique identifier associated therewith. Each time an attendee interacts with a POI, the system tags the interaction by associating the attendee with the POI/object. System 100 may associate other information with each transaction. For example, system 100 may associate a timestamp with each interaction. In this way, system 100 can discern how much time each attendee interacts with each POI/object.

At step 209, an attendee's data is analyzed. Based on the data collected from an attendee's interactions within the environment, system 100 can calculate and analyze various parameters. An exemplary parameter that may be analyzed is bounce rate. Bounce rate is characterized by an attendee's session wherein the attendee interacts with single POI or object. For example, Bounce rates may be calculated as a single-page sessions divided by all sessions, or the percentage of all sessions on virtual exhibition or event site in which attendees viewed only a single page and triggered only a single request to a server. Bounce rates may also be based on a percentage of all interactions for the exhibition in which attendees interacted with a single POI or object.

Another exemplary parameter that may be analyzed is events and may be calculated independently from a web page or screen load. Downloads, mobile ad clicks, gadgets, AJAX embedded elements, and video plays are all examples of actions that characterize events. Similarly, unique events may be analyzed and may be characterized by interactions with content by a single attendee within a single session that can be tracked separately from pageviews or screen views.

Another exemplary parameter that may be analyzed is attendee. An attendee is a user that has initiated a session within the system by, for example, entering the exhibition environment, including a physical environment, a virtual environment, or a combination thereof. An attendee may be a new attendee, i.e., one that has never entered the exhibition environment, or a returning attendee, i.e., one that has previously entered the exhibition environment. An attendee's interaction and history may be analyzed by, for example, using identifying information associated with UE 101, for example, an IP address, MAC identification, or browser cookies.

Another exemplary parameter that may be analyzed is session, characterized by a record of a single attendee interacting with the exhibition environment during a given time period, which may include multiple interactions with objects/POIs, screen views, pageviews, events, or transactions. For example, a session may end at midnight on the day a session was initiated or after a predetermined amount of time of inactivity.

At step 211, system 100 outputs an attendee's data. The output may include raw data collected, analyzed data, results of the data analyzed, or a combination thereof. The data may be output in a computer-readable format for integration into other system, for example, in a comma-delineated format, or formatted for human review, for example, a PDF or Word document. The outputted data may also include graphical representations of the data, e.g., graphs, charts, plots, or other data visualizations, displayed on an automatically created dashboard.

The processes described herein for providing an exhibition environment may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 3:
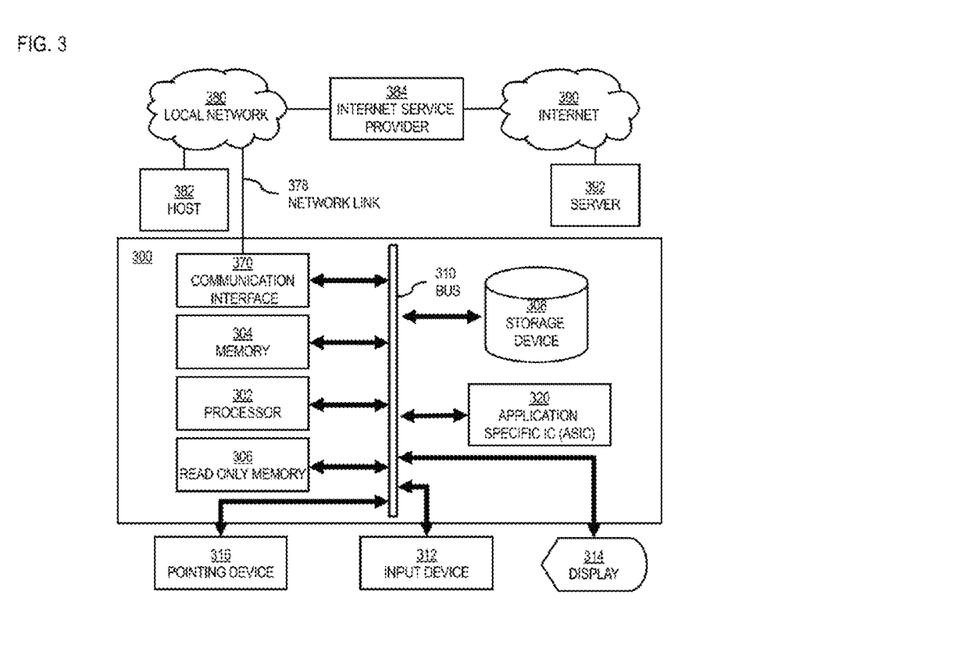
FIG. 3 is an exemplary diagram of hardware that can be used to implement an embodiment of the invention.

FIG. 3 illustrates a computer system 300 upon which an embodiment of the invention may be implemented. Computer system 300 is programmed (e.g., via computer program code or instructions) to provide a virtual and semi-virtual event and exhibition environment as described herein and includes a communication mechanism such as a bus 310 for passing information between other internal and external components of the computer system 300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 310 includes one or more parallel conductors of information so that information is transferred quickly among devices coupled to the bus 310. One or more processors 302 for processing information are coupled with the bus 310.

A processor 302 performs a set of operations on information as specified by computer program code related to provide a virtual and semi-virtual event and exhibition environment. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 310 and placing information on the bus 310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 300 also includes a memory 304 coupled to bus 310. The memory 304, such as a random access memory (RAM) or other dynamic storage device, stores information including processor instructions for provide a virtual and semi-virtual event and exhibition environment. Dynamic memory allows information stored therein to be changed by the computer system 300. RAM allows a unit of information stored at a location called a memory address to be stored and retrieved independently of information at neighboring addresses. The memory 304 is also used by the processor 302 to store temporary values during execution of processor instructions. The computer system 300 also includes a read only memory (ROM) 306 or other static storage device coupled to the bus 310 for storing static information, including instructions, that is not changed by the computer system 300. Some memory is composed of volatile storage that loses the information stored thereon when power is lost. Also coupled to bus 310 is a non-volatile (persistent) storage device 308, such as a magnetic disk, optical disk or flash card, for storing information, including instructions, that persists even when the computer system 300 is turned off or otherwise loses power.

Information, including instructions for providing a virtual and semi-virtual event and exhibition environment, is provided to the bus 310 for use by the processor from an external input device 312, such as a keyboard containing alphanumeric keys operated by a human user, or a sensor. A sensor detects conditions in its vicinity and transforms those detections into physical expression compatible with the measurable phenomenon used to represent information in computer system 300. Other external devices coupled to bus 310, used primarily for interacting with humans, include a display device 314, such as a direct-view light emitting diodes (LED), organic light emitting diodes (OLED), light-field display (LFD), cathode ray tube (CRT) or a liquid crystal display (LCD), or plasma screen or printer for presenting text or images, and a pointing device 316, such as a mouse or a trackball or cursor direction keys, or motion sensor, for controlling a position of a small cursor image presented on the display 314 and issuing commands associated with graphical elements presented on the display 314. In some embodiments, for example, in embodiments in which the computer system 300 performs all functions automatically without human input, one or more of external input device 312, display device 314 and pointing device 316 is omitted.

In the illustrated embodiment, special purpose hardware, such as an application specific integrated circuit (ASIC) 320, is coupled to bus 310. The special purpose hardware is configured to perform operations not performed by processor 302 quickly enough for special purposes. Examples of application specific ICs include graphics processing units (GPU) that may, for example, generate 2D and 2D environments, graphics accelerator cards for generating images for display 314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 300 also includes one or more instances of a communications interface 370 coupled to bus 310. Communication interface 370 provides a one-way or two-way communication coupling to a variety of external devices that operate with their own processors, such as printers, scanners and external disks. In general, the coupling is with a network link 378 that is connected to a local network 380 to which a variety of external devices with their own processors are connected. For example, communication interface 370 may be a parallel port or a serial port or a universal serial bus (USB) port on a personal computer. In some embodiments, communications interface 370 is an integrated services digital network (ISDN) card or a digital subscriber line (DSL) card or a telephone modem that provides an information communication connection to a corresponding type of telephone line. In some embodiments, a communication interface 370 is a cable modem that converts signals on bus 310 into signals for a communication connection over a coaxial cable or into optical signals for a communication connection over a fiber optic cable. As another example, communications interface 370 may be a local area network (LAN) card to provide a data communication connection to a compatible LAN, such as Ethernet. Wireless links may also be implemented. For wireless links, the communications interface 370 sends or receives or both sends and receives electrical, acoustic or electromagnetic signals, including infrared and optical signals, that carry information streams, such as digital data. For example, in wireless handheld devices, such as mobile telephones like cell phones, the communications interface 370 includes a radio band electromagnetic transmitter and receiver called a radio transceiver. In certain embodiments, the communications interface 370 enables connection to the communication network 107 for providing a virtual and semi-virtual event and exhibition environment to the UE 101.

The term computer-readable medium is used herein to refer to any medium that participates in providing information to processor 302, including instructions for execution. Such a medium may take many forms, including, but not limited to, non-volatile media, volatile media and transmission media. Non-volatile media include, for example, optical or magnetic disks, such as storage device 308. Volatile media include, for example, dynamic memory 304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, Blu-ray, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 4:
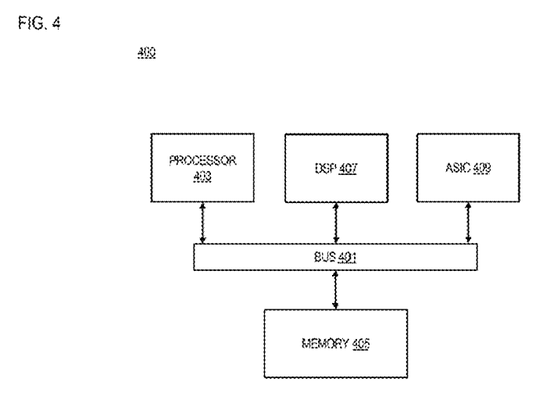
FIG. 4 is an exemplary diagram of a chip set that can be used to implement an embodiment of the invention.

FIG. 4 illustrates a chip set 400 upon which an embodiment of the invention may be implemented. Chip set 400 is programmed to provide a virtual and semi-virtual event and exhibition environment as described herein and includes, for instance, the processor and memory components described with respect to FIG. 3 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 400 includes a communication mechanism such as a bus 401 for passing information among the components of the chip set 400. A processor 403 has connectivity to the bus 401 to execute instructions and process information stored in, for example, a memory 405. The processor 403 may include one or more processing cores with each core configured to perform independently. A multi-core processor enables multiprocessing within a single physical package. Examples of a multi-core processor include two, four, eight, or greater numbers of processing cores. Alternatively, or in addition, the processor 403 may include one or more microprocessors configured in tandem via the bus 401 to enable independent execution of instructions, pipelining, and multithreading. The processor 403 may also be accompanied with one or more specialized components to perform certain processing functions and tasks such as one or more digital signal processors (DSP) 407, or one or more application-specific integrated circuits (ASIC) 409. A DSP 407 typically is configured to process real-world signals (e.g., sound) in real time independently of the processor 403. Similarly, an ASIC 409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 403 and accompanying components have connectivity to the memory 405 via the bus 401. The memory 405 includes both dynamic memory (e.g., RAM, magnetic disk, writable optical disk, etc.) and static memory (e.g., ROM, CD-ROM, etc.) for storing executable instructions that when executed perform the inventive steps described herein to provide a virtual and semi-virtual event and exhibition environment. The memory 405 also stores the data associated with or generated by the execution of the inventive steps.

Figure 5:
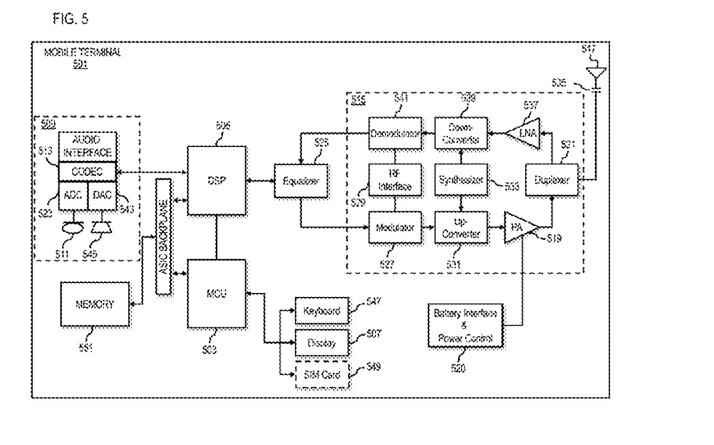
FIG. 5 is an exemplary diagram of a mobile station (e.g., handset) that can be used to implement an embodiment of the invention.

FIG. 5 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 503, a Digital Signal Processor (DSP) 505, and a receiver/transmitter unit including a microphone gain control unit and a speaker gain control unit. A main display unit 507 provides a display to the user in support of various applications and mobile station functions that offer automatic contact matching. An audio function circuitry 509 includes a microphone 511 and microphone amplifier that amplifies the speech signal output from the microphone 511. The amplified speech signal output from the microphone 511 is fed to a coder/decoder (CODEC) 513.

A radio section 515 amplifies power and converts frequency in order to communicate with a base station, which is included in a mobile communication system, via antenna 517. The power amplifier (PA) 519 and the transmitter/modulation circuitry are operationally responsive to the MCU 503, with an output from the PA 519 coupled to the duplexer 521 or circulator or antenna switch, as known in the art. The PA 519 also couples to a battery interface and power control unit 520.

In use, a user of mobile station 501 speaks into the microphone 511 and his or her voice along with any detected background noise is converted into an analog voltage. The analog voltage is then converted into a digital signal through the Analog to Digital Converter (ADC) 523. The control unit 503 routes the digital signal into the DSP 505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 525 for compensation of any frequency-dependent impairments that occur during transmission though the air such as phase and amplitude distortion. After equalizing the bit stream, the modulator 527 combines the signal with a RF signal generated in the RF interface 529. The modulator 527 generates a sine wave by way of frequency or phase modulation. In order to prepare the signal for transmission, an up-converter 531 combines the sine wave output from the modulator 527 with another sine wave generated by a synthesizer 533 to achieve the desired frequency of transmission. The signal is then sent through a PA 519 to increase the signal to an appropriate power level. In practical systems, the PA 519 acts as a variable gain amplifier whose gain is controlled by the DSP 505 from information received from a network base station. The signal is then filtered within the duplexer 521 and optionally sent to an antenna coupler 535 to match impedances to provide maximum power transfer. Finally, the signal is transmitted via antenna 517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 501 are received via antenna 517 and immediately amplified by a low noise amplifier (LNA) 537. A down-converter 539 lowers the carrier frequency while the demodulator 541 strips away the RF leaving only a digital bit stream. The signal then goes through the equalizer 525 and is processed by the DSP 505. A Digital to Analog Converter (DAC) 543 converts the signal and the resulting output is transmitted to the user through the speaker 545, all under control of a Main Control Unit (MCU) 503—which can be implemented as a Central Processing Unit (CPU) (not shown).

The MCU 503 receives various signals including input signals from the keyboard 547. The keyboard 547 and/or the MCU 503 in combination with other user input components (e.g., the microphone 511) comprise a user interface circuitry for managing user input. The MCU 503 runs a user interface software to facilitate user control of at least some functions of the mobile station 501 to provide a virtual and semi-virtual event and exhibition environment. The MCU 503 also delivers a display command and a switch command to the display 507 and to the speech output switching controller, respectively. Further, the MCU 503 exchanges information with the DSP 505 and can access an optionally incorporated SIM card 549 and a memory 551. In addition, the MCU 503 executes various control functions required of the station. The DSP 505 may, depending upon the implementation, perform any of a variety of conventional digital processing functions on the voice signals. Additionally, DSP 505 determines the background noise level of the local environment from the signals detected by microphone 511 and sets the gain of microphone 511 to a level selected to compensate for the natural tendency of the user of the mobile station 501.

The CODEC 513 includes the ADC 523 and DAC 543. The memory 551 stores various data including call incoming tone data and is capable of storing other data including data received via, e.g., the global Internet. The software module could reside in RAM memory, flash memory, registers, or any other form of writable computer-readable storage medium known in the art including non-transitory computer-readable storage medium. For example, the memory device 551 may be, but not limited to, a single memory, CD, DVD, ROM, RAM, EEPROM, optical storage, or any other non-volatile or non-transitory storage medium capable of storing digital data.

An optionally incorporated SIM card 549 carries, for instance, important information, such as the cellular phone number, the carrier supplying service, subscription details, and security information. The SIM card 549 serves primarily to identify the mobile station 501 on a radio network. The card 549 also contains a memory for storing a personal telephone number registry, text messages, and user specific mobile station settings.

Figure 6:
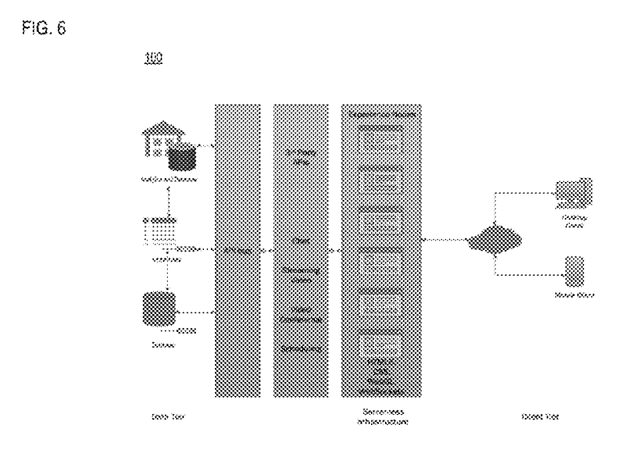
FIG. 6 is an exemplary diagram of a system architecture that can be used to implement an embodiment of the invention.

FIG. 6 is an exemplary architecture for a system 100 capable of generating a virtual event and exhibit, according to one embodiment.

Figure 7:
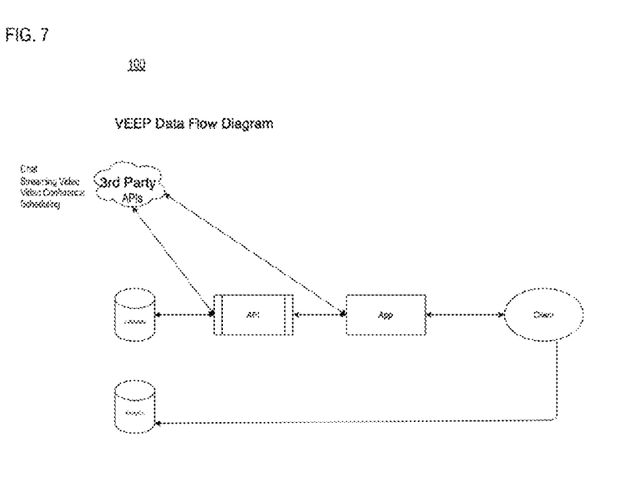
FIG. 7 is an exemplary data flow diagram of a system architecture that can be used to implement an embodiment of the invention.

FIG. 7 is an exemplary data flow diagram for a system 100 capable of generating a virtual event and exhibit, according to one embodiment.

While the invention has been described in connection with a number of embodiments and implementations, the invention is not so limited but covers various apparent modifications and equivalent arrangements, which fall within the purview of the appended claims. Although features of the invention are expressed in certain combinations among the claims, it is contemplated that these features can be arranged in any combination and order. The invention has been described herein using specific embodiments for illustrative purposes only. It will be readily apparent to one of ordinary skill in the art, however, that the principles of the invention can be embodied in other ways. Therefore, the invention should not be regarded as limited in scope to the specific embodiments disclosed herein; it should be fully commensurate in scope with the following claims.

I claim:

1. A system for generating a virtual experience on a user's equipment comprising:
   a virtual event and exhibition platform (VEEP) widget that allows a user to display a virtual environment on a user's equipment;
   environment generator, wherein the environment generator is communicatively connected to an environment database;
   avatar generator;
   navigator;
   content manager, wherein the content manager communicates with a content database and updates the virtual environment generated by the environment generator;
   data collector; and
   data analyzer, wherein the data collector and the data analyzer collect data associated with the user as they interact with the virtual environment generated by the environment generator and stores the data in a collection database and wherein the environment generator, the avatar generator, the navigator, the content manager, the data collector, and the data analyzer communicate by exchanging discrete packets of data.

2. The system for generating a virtual experience on a user's equipment of claim 1, wherein the discrete packets of data comprise:
   header information associated with a particular protocol;
   payload information that follows the header information and contains information that is processed independently of the particular protocol;
   trailer information following the payload information and indicating the end of the payload information, wherein the header information comprises: source of the discrete packet;
   destination of the discrete packet; and length of the payload information.

3. The system for generating a virtual experience on a user's equipment of claim 1, wherein the environment generator generates two-dimensional and three-dimensional models of virtual environments by accessing three-dimensional wireframes or models stored on the environment database.

4. The system for generating a virtual experience on a user's equipment of claim 1, wherein the environment generated by the environment generator is entirely virtual or a combination of virtual and real-world environments.

5. The system for generating a virtual experience on a user's equipment of claim 4, wherein the environment comprises one or more points of interest (POIs) or objects that the user may interact with.

6. The system for generating a virtual experience on a user's equipment of claim 4, wherein via the VEEP widget the user can interact with the virtual environment generated by the environment generator and also with the real-world physical environment surrounding the user and also interact with other users in the same environment.

7. The system for generating a virtual experience on a user's equipment of claim 6, wherein the users' interactions with POIs and objects within the virtual and real-world environment are detected and recorded by the data collector and analyzer.

8. The system for generating a virtual experience on a user's equipment of claim 1, wherein the avatar generator generates three-dimensional models of users by accessing three-dimensional wireframes or models of virtual human/humanoid stored in the environment database.

9. The system for generating a virtual experience on a user's equipment of claim 1, wherein the avatar generator generates a photo-realistic three-dimensional model of the user or users using photogrammetry and built-in digital cameras on the user's equipment.

10. The system for generating a virtual experience on a user's equipment of claim 1, wherein the data analyzer tracks, analyzes, and outputs data regarding the user interactions with the virtual environment.

11. The system for generating a virtual experience on a user's equipment of claim 10, wherein data collector utilizes eye tracking hardware to determine what the user looks at and shows interest in.

12. The system for generating a virtual experience on a user's equipment of claim 1, wherein the data collector and the data analyzer detect, generate, and extrapolate heat maps that represent how much time a user spends in a location and with certain objects within the environment.

13. A process method for proving a virtual experience on a user's equipment, the method comprising the steps of:
generating, at a user's equipment, a virtual environment by executing a virtual event and exhibition platform (VEEP) widget, wherein the virtual environment is generated by an environment generator from certain parameters stored on an environment database; and wherein the virtual environment comprises one or more virtual points of interest (POI) or objects with which a user can interact;
registering the user for the virtual experience;
user interacting with the one or more virtual POIs and objects within the virtual environment, wherein the user interacts with the one or more virtual POI and objects within the virtual environment by selecting through the VEEP widget or by positioning an avatar of the user looking at a virtual POI and or objects;
recording the user's interactions with the one or more virtual POI and objects within the virtual environment;
analyzing the user's interactions with the one or more virtual POI and objects within the virtual environment;
outputting interaction data associated with user's interactions with the one or more virtual POI and objects within the virtual environment, wherein the interaction data is automatically formatted in a graphical representation.

* * * * *